United States Patent Office

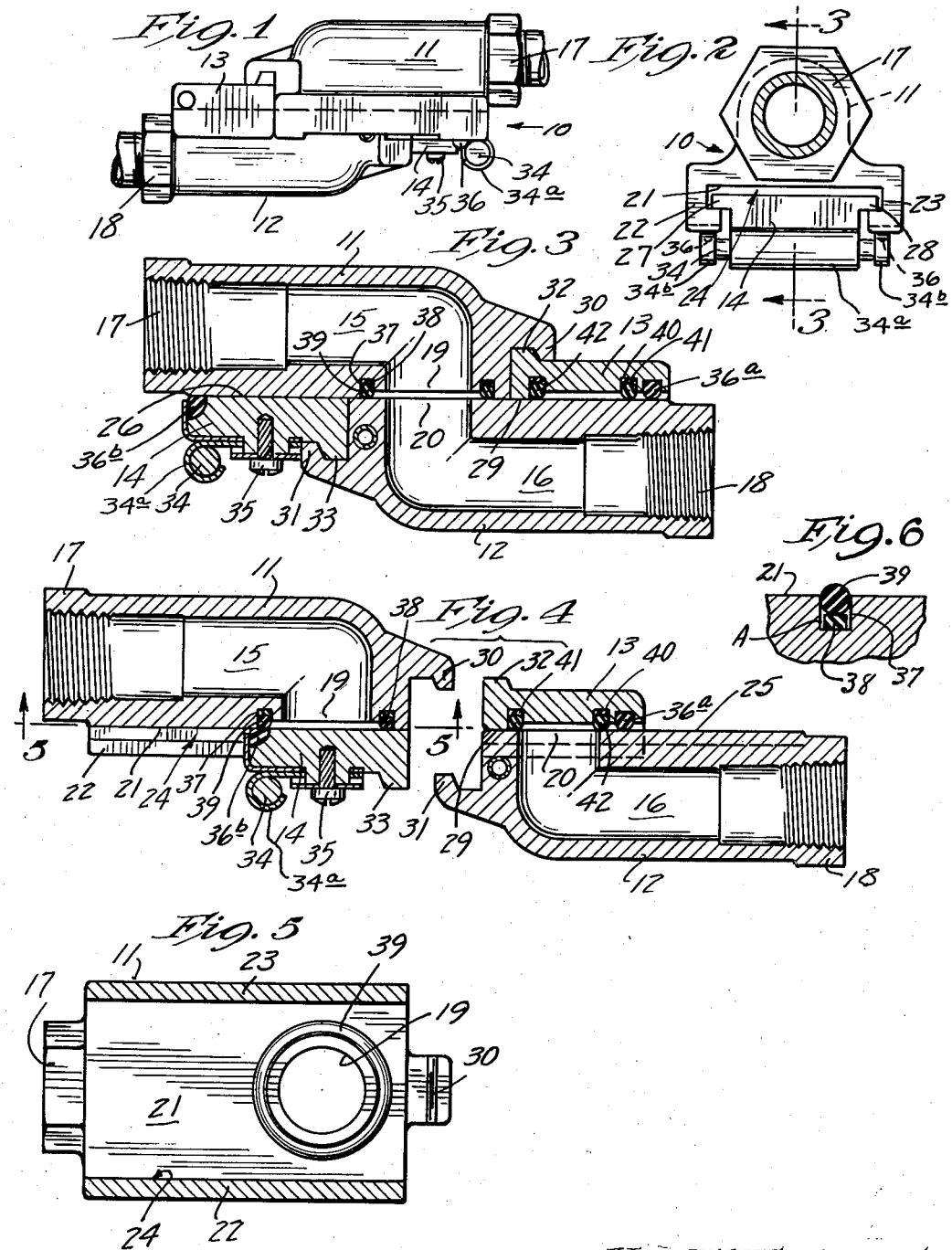

2,844,391
Patented July 22, 1958

2,844,391

SEAL FOR FLUID COUPLINGS

Kenneth A. Albers, Minneapolis, Minn., assignor to Char-Lynn Co., Minneapolis, Minn., a corporation of Minnesota Application August 5, 1954, Serial No. 448,058

2 Claims. (Cl. 284—7)

My invention relates to improvements in a fluid-tight seal. In particular, it relates to an improved fluid-tight seal between relatively movable members.

To effect a proper seal against leakage between adjacent members generally requires a resilient sealing material carried by one of the members pressing against the adjacent surface of the other member; and the resilient sealing or packing material is generally of a soft rubber-like quality. This type of sealing material is not entirely satisfactory where the adjacent members are movable with respect to each other because of the wear on the outer contacting surface of the seal and because a soft, resilient sealing material tends to follow in the direction of relative movement creating a frictional relationship between the movable members and retarding the movement thereof. An increase in the hardness of the sealing material to give increased wear and a decreased frictional relationship would generally result in a sacrifice in resiliency and, therefore, of effective fluid-tight sealing. Therefore, it is an object of my invention to provide a novel and improved fluid-tight seal, wherein an outer periphery or wearing surface of the seal is formed of a relatively hard, firm, rubber-like material and an inner portion of the seal is formed of a relatively soft, easily flowing, resilient rubber-like material.

It is another object of my invention to provide an improved fluid-tight seal between adjacent movable members consisting of a gasket of relatively soft, easily flowing, resilient, rubber-like material channeled in one of the members and having a cross sectional width less than the cross sectional width of the channel, and a sealing element of relatively hard, firm, rubber-like material positioned in abutting relationship with the gasket, whereby the gasket yieldingly biases the sealing element into sealing engagement with the adjacent surface of the other member.

These and other objects will be disclosed in the course of the following specification and claims, reference being had to the accompanying drawings wherein:

Fig. 1 is a view in side elevation of a separable coupling for hose or pipe in which my invention is effectively used;

Fig. 2 is a view in front elevation of the structure shown in Fig. 1;

Fig. 3 is an enlarged view in cross section taken along line 3—3 of Fig. 2 showing the coupled position of the separable coupling;

Fig. 4 is an enlarged cross sectional view similar to Fig. 3 showing the separated position of the separable coupling;

Fig. 5 is a view partly in cross section and partly in bottom plan taken along line 5—5 of Fig. 4;

Fig. 6 is an enlarged detailed view in cross section of my novel sealing means when under no external compressive force.

Referring more particularly to Figs. 1–5, my invention is used in a separable coupling designated by general reference numeral 10, including a pair of coupling members 11 and 12 and closure members 13 and 14. The coupling members 11 and 12 have passages 15 and 16, respectively, extending therethrough, and outer threaded ends 17 and 18, respectively, to receive the fittings of hose or pipe. The passages 15 and 16 extend from the threaded ends 17 and 18 to openings 19 and 20, respectively.

Coupling member 11 is provided with a longitudinally extending flat face 21 substantially coplanar with the opening 19 and downwardly and inwardly projecting flanges 22 and 23 at opposite lateral edges of the face 21. Flanges 22 and 23 define a guide channel 24 to receive a longitudinally extending flat face 25, substantially coplanar with opening 20, and longitudinally extending flanges laterally projecting therefrom of coupling member 12. Guide channel 24 positions coupling member 11 and coupling member 12 in a slidably movable face-to-face relationship.

Closure member 14 is provided with a flat face 26, Fig. 3, and laterally projecting flanges 27 and 28, Fig. 2, which are similar to the laterally projecting flanges of coupling member 12, and is positioned in guide channel 24 for face-to-face sliding movement with coupling member 11. Closure member 13 is provided with a flat face 29 and downwardly and inwardly projecting flanges at opposite lateral edges of face 29 similar to flanges 22 and 23. Closure member 13 is mounted on coupling member 12 in a face-to-face slidably movable relationship with the laterally projecting flanges of coupling member 12 received in the downwardly and inwardly projected flanges of closure member 13 in the manner shown in Fig. 2 in respect to closure member 14 and coupling member 11. Closure member 13 and closure member 14 are retained in face-to-face relationship with coupling members 12 and 11, respectively, for limited reciprocatory movement between the two positions shown in Figs. 3 and 4.

Coupling member 11 is provided with a hook portion 30 and coupling member 12 is provided with a similar hook portion 31 both of which are adapted to engage laterally extending projections 32 and 33, respectively, at the ends of closure members 13 and 14. The hook portions 30 and 31 are engageable with projections 32 and 33, respectively, when closure members 13 and 14 are at the limit of movement in one direction at which position they are adapted to close the openings 19 and 20, as clearly shown in Fig. 4.

When hooks 30 and 31 are engaged with projections 32 and 33, respectively, coupling member 12 is automatically positioned for sliding movement into guide channel 24 to the coupled position shown in Fig. 3 which is the opposite limit of movement of closure members 13 and 14, at which position opening 19 is automatically axially aligned with opening 20 to provide a passageway from one coupling member to the other. This coupled position is maintained by means of a locking bolt 34 supported for limited axial movements, between latched and released positions, by a sleeve-forming member 34a secured to closure member 14 by screw 35. At the latched position of locking bolt 34, the opposite ends or heads 34b thereof, Fig. 2, each engage one of a pair of spaced outwardly projecting lugs 36 which are preferably formed with or rigidly secured, by welding or the like, to coupling member 11 adjacent one end of coupling member 11. Locking bolt 34 is axially movable in either direction from its latched position, Fig. 2, to a released position wherein the ends or heads 34b of locking bolt 34 are each laterally disposed to one side or the other of its associated lug 36.

When it is desired to separate coupling members 11 and 12 from the coupled position of Fig. 3, locking bolt 34 is first released, coupling member 11 is then movable to the left and coupling member 12 is movable to the right, referring to Fig. 3. The movement of coupling member 11 to the left pulls closure member 13 over passage opening 20 of closure member 12; and likewise, the movement of coupling member 12 to the right pulls closure member 14 over passage opening 19 of coupling member 11. When closure members 13 and 14 are positioned over the openings 19 and 20, respectively, further movement thereof in the same direction is prevented, and they are in the position shown in Fig. 4. At this position, coupling member 12 is no longer positioned in guide channel 24; and coupling members 11 and 12 are separable, each carrying the respective closure member mounted therewith.

Because dust and grit accumulate in the exposed portions of flat faces 25 and 21 when coupling members 11 and 12 are in the separated position shown in Fig. 4, laterally extending wipers 36a and 36b are carried by closure members 13 and 14, respectively, to clean these exposed surfaces and prevent the dust and grit from entering between the adjacent flat surfaces.

Novel sealing means are associated with each coupling member 11 and 12. Coupling member 11 is provided with an annular channel 37 in circumscribed relationship with its opening 19. The entrance of channel 37 adjoins the adjacent flat face 25 of coupling member 12 when the coupling members 11 and 12 are in the coupled position of Fig. 3, and adjoins the adjacent flat face 26 of closure member 14 when the coupling members 11 and 12 are in the separated position of Fig. 4. An annular gasket 38 formed of relatively soft, easily flowing, resilient rubber-like material is first positioned in channel 37 to be wholly contained therein and contacting the bottom thereof, and preferably is flat on its top and bottom surfaces. As clearly shown in Fig. 7, gasket 38 has a cross sectional width which is less than the cross sectional width of channel 37; specifically, the distance between the concentric cylindrical size of gasket 38 is less than the distance between the concentric cylindrical size of channel 37. This difference in size between gasket 38 and channel 37 gives the gasket 38 space in which to flow laterally when stressed by a compressive force. Next positioned in channel 37 in abutting relationship with the top surface of gasket 38 is an annular sealing element or O-ring 39 formed of relatively hard, firm, rubber-like material, such as neoprene. O-ring 39 generally conforms to the shape of channel 37, and preferably has convex top and bottom surfaces. When positioned in channel 37 and if under no external force, O-ring 39 would protrude to some extent beyond the entrance of channel 37 at flat face 21, see Fig. 7; however, as seen in Figs. 3 and 4, flat face 25 of coupling member 12 and flat face 26 of closure member 14 are alternately movable over in contact with the O-ring 39 to force it downwardly against gasket 38. O-ring 39 is bodily displaced but retains substantially its undistorted shape, and the compressive force exerted by the adjacent flat face is largely absorbed by the gasket 38, which flows into the space A of channel 37 below the O-ring 39, Fig. 7. Gasket 38, being capable of further distortion, yieldingly biases O-ring 39 into excellent sealing engagement with the adjacent flat face, which may be flat face 25 of coupling member 12 or may be flat face 26 of closure member 14. Thus, the sealing means associated with coupling member 11 serves two functions. It acts as a seal between coupling member 11 and coupling member 12 around the openings 19 and 20 when the coupling members are in their coupled position of Fig. 3; and it acts as a seal between coupling member 11 and closure member 14 around the opening 19 when the coupling members are in their separated position of Fig. 4.

The sealing means associated with coupling member 12 is positioned in an annular channel 40 formed in closure member 13 and adapted to circumscribe opening 20 when the coupling members 11 and 12 are in their separated position shown in Fig. 4. Annular channel 40 is similar to channel 37. The sealing means associated with coupling member 12 comprises an annular gasket 41, similar to gasket 38, and a sealing element or O-ring 42, similar to sealing element 39. Gasket 41 and O-ring 42 are positioned in channel 40 in the same manner that gasket 38 and O-ring 39 are positioned in channel 37; and Fig. 6 which shows a detailed cross sectional view of gasket 38 and O-ring 39 positioned in channel 37 when under no external compressive force, is equally applicable to show the relationship of gasket 41 and O-ring 42 with respect to channel 40 when no external force is applied. The operation of the sealing means associated with coupling member 12 is similar to the operation of the sealing means associated with coupling member 11 which was previously explained. The compressive force exerted by the adjacent flat face 25 is absorbed by the gasket 41 which flows into a space of channel 40 below the O-ring 42, similar to space A shown in Fig. 6; and O-ring 42 remains substantially undistorted. Gasket 41, being capable of further distortion, yieldingly biases sealing member or O-ring 42 into excellent sealing engagement with the adjoining flat face 25 of coupling member 12 to form a fluid-tight seal between coupling member 12 and closure member 13 around the opening 20 when coupling members 11 and 12 are at their separated position, shown in Fig. 4.

Although the sealing means comprising gasket 38 and O-ring 39 or gasket 41 and O-ring 42 have been disclosed herein as separated elements, they might be formed as an integral annular seal having an outer portion formed of relatively hard, firm, rubber-like material and an inner portion formed of a soft, easily flowing, resilient, rubber-like material.

O-rings 39 and 42 will be in contact with adjacent slidably movable flat faces; the former with faces 26 and 25, and the latter with face 25. When the faces are moved, either during coupling or uncoupling of the members 11 and 12, O-rings 39 and 42 do not extrude to the extent that they hinder or resist the relative movement of the faces but rather may be depressed against the yielding resilient backing formed by gaskets 38 and 41. Further, the O-rings 39 and 42 being of firm and relatively hard rubber-like material and having a resilient backing are not distorted by any shearing force caused by the movement of the adjacent flat faces and do not tend to follow in the direction of relative movement as would be the case if an ordinary, suitable sealing ring were applied. Thus, by the use of my novel and improved sealing means, there is less wear and less friction than by the use of formerly known, ordinary sealing means.

In addition, O-rings 39 and 42, being formed of a firm and relatively hard rubber-like material, are not extruded laterally into the clearance space between adjacent flat faces by high pressures within the coupling members 11 and 12, which would make coupling and uncoupling very difficult; therefore, regardless of the pressures with the coupling members 11 and 12, these coupling members being provided with my novel and improved sealing means, are capable of a constant, easy, push-pull operation. Another important feature of my novel sealing means is that the provision of gaskets 38 and 41 of relatively soft, rubber-like material backing the O-rings 39 and 42 permits greater machining tolerances in making the channels 37 and 40, and between cooperating parts, in particular, the adjacent flat faces.

It will be obvious to those skilled in the art that my invention may be modified by many substitutions and equivalents and that this disclosure is intended to be illustrative only. Therefore, I intend to be limited solely by the scope of the appended claims.

What I claim is:

1. In a device of the class described, a pair of members having adjacent surfaces in slidably removable relationship, one of said members having a cylindrical internal bore for the passage of fluid therethrough opening at its said surface and the other of said surfaces forming a solid surface area movable across said opening at right angles thereto to resist the flow of fluid through said bore, one of said members having an annular channel opening toward the adjacent surface of the other member and disposed in coaxial circumscribed relationship with said opening when said solid surface area is across said opening, an annular gasket of relatively soft rubber-like material being first positioned and wholly contained within said channel and having a cross-sectional width less than the cross-sectional width of said channel, and an O-ring of relatively hard rubber-like material being next positioned within said channel in abutting relationship with said gasket, said O-ring having inner and outer diameters substantially equal to the inner and outer diameters of said annular channel, whereby said O-ring is maintained against radial movement within said channel but is axially movable toward the adjacent surface of said other member.

2. In a fluid coupler, two coupling members having longitudinally extending flat faces and having fluid passages therethrough which open at said flat faces, said members being slidably movable with respect to each other in face to face relationship from a coupled position to a separated position, the openings of said passages being in register to form a flow passageway from one member to the other when said coupling members are in coupled position, two flat faced closure members each being connected in face to face relationship with a different one of said coupling members for longitudinal sliding movements with respect thereto between a position longitudinally spaced from the passage opening thereof at the coupled position of said coupling members and a position over the passage opening thereof at the separated positions of said coupling members, each of said closure members being releasably connected to the other coupling member than said one in face to face relationship therewith with its flat face in end to end adjoining generally coplanar relationship with the flat face of said other coupling member, a pair of laterally extending wipers each carried by a different one of said closure members at the end thereof removed from the coupling member with which its associated closure member is in end to end relationship and disposed to extend across in engagement with the flat face of the coupling member with which its associated closure member is in face to face relationship, an annular channel formed in one of said coupling members in coaxial circumscribed relationship with its passage opening, said channel opening toward the flat face of the other coupling member, a second annular channel formed in the closure member which is in end to end relationship with the coupling member having the first mentioned channel formed therein, said second channel opening toward the flat face of the coupling member with which the closure member having said second channel is in face to face relationship, said second channel being positioned in coaxial circumscribed relationship with the passage opening of said last-mentioned coupling member, when said coupling members are in separated position, a pair of gaskets of relatively soft resilient rubber-like material each being positioned and wholly contained within a different one of said channels and contacting the bottom thereof, said gaskets having a smaller cross-sectional width than the width of the channel with which it is associated, and a pair of sealing O-rings of relatively hard rubber-like material each being positioned within a different one of said channels in abutting relationship with said gaskets, each of said O-rings having an inner diameter and an outer diameter substantially equal to the inner and outer diameters of the channel within which it is positioned."

References Cited in the file of this patent
UNITED STATES PATENTS

| | | |
|---|---|---|
| 1,765,693 | Muend | June 24, 1930 |
| 2,330,220 | Kemper | Sept. 28, 1943 |
| 2,500,847 | McKay | Mar. 14, 1950 |
| 2,661,967 | Mitchell | Dec. 8, 1953 |